US009440306B2

(12) United States Patent
Amagata (10) Patent No.: US 9,440,306 B2
(45) Date of Patent: Sep. 13, 2016

(54) SPOT WELDING SYSTEM INCLUDING SPOT WELDING GUN

(71) Applicant: FANUC CORPORATION, Minamitsuru-Gun, Yamanashi (JP)

(72) Inventor: Yasuhiro Amagata, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 125 days.

(21) Appl. No.: 14/215,727

(22) Filed: Mar. 17, 2014

(65) Prior Publication Data
US 2014/0291300 A1  Oct. 2, 2014

(30) Foreign Application Priority Data

Mar. 28, 2013  (JP) .................................. 2013-069816

(51) Int. Cl.
*B23K 9/12* (2006.01)
*B23K 11/11* (2006.01)
(Continued)

(52) U.S. Cl.
CPC ............ *B23K 11/115* (2013.01); *B23K 11/253* (2013.01); *B23K 11/3009* (2013.01); *B23K 11/311* (2013.01); *B23K 11/315* (2013.01)

(58) Field of Classification Search
CPC ................................. B23K 11/11; B23K 11/24
USPC ........................ 219/86.1, 86.33, 86.41, 86.51
See application file for complete search history.

(56) References Cited

U.S. PATENT DOCUMENTS 5,510,593 A * 4/1996 Sakai ................... B23K 11/314
                                                            219/86.7
5,582,747 A * 12/1996 Sakai ................... B23K 11/253
                                                            219/109
(Continued)

FOREIGN PATENT DOCUMENTS

CN  102267003  12/2011
DE  102004015704  10/2005
(Continued)

OTHER PUBLICATIONS

Japanese Office Action dated Jul. 11, 2014, for Japanese Patent Application No. 2013-069816.
(Continued)

*Primary Examiner* — Dana Ross
*Assistant Examiner* — Ayub Maye
(74) *Attorney, Agent, or Firm* — RatnerPrestia (57) ABSTRACT

A spot welding system (1) includes a welding pressure command generating unit (31) which generates a reference welding pressure command for a spot welding gun by applying pressure to workpieces to be welded between two electrode tips and at least one detective welding pressure command, an elastic displacement quantity deviation calculating unit (32) calculating, as an elastic displacement quantity deviation, a rotational position deviation between the rotational position of a servomotor when the reference welding pressure command is used and the rotational position of the servomotor when at least one detective welding pressure command is used, and an estimating unit (34) which estimates that there is an abnormality in the spot welding gun when the deviation between the elastic displacement quantity deviation based on the reference welding pressure command and at least one detective welding pressure command and the reference displacement quantity deviation is greater than a predetermined value.

12 Claims, 7 Drawing Sheets

(51) Int. Cl.
    *B23K 11/25*    (2006.01)
    *B23K 11/30*    (2006.01)
    *B23K 11/31*    (2006.01)

(56) References Cited

U.S. PATENT DOCUMENTS

| | | | | |
|---|---|---|---|---|
| 6,236,011 | B1 * | 5/2001 | Kato | B23K 11/252 |
| | | | | 219/86.41 |
| 6,313,427 | B1 * | 11/2001 | Suita | B23K 11/10 |
| | | | | 219/109 |
| 6,531,674 | B2 * | 3/2003 | Suita | B23K 11/10 |
| | | | | 219/109 |
| 2001/0045413 | A1 * | 11/2001 | Suita | B23K 11/10 |
| | | | | 219/86.51 |
| 2012/0200695 | A1 * | 8/2012 | Yamane | G01B 11/08 |
| | | | | 348/90 |

FOREIGN PATENT DOCUMENTS

| | | | |
|---|---|---|---|
| EP | 2011598 | | 1/2009 |
| JP | 02084276 | A * | 3/1990 |
| JP | 3503359 | B | 4/1998 |
| JP | 10094882 | A * | 4/1998 |
| JP | 2006-218525 | | 8/2006 |
| JP | 2007-29994 | | 2/2007 |
| JP | 2008-296226 | A | 12/2008 |
| JP | 2009056480 | | 3/2009 |
| JP | 2009-106986 | | 5/2009 |
| JP | 2010-000528 | | 1/2010 |
| JP | 2012179657 | | 9/2012 |
| JP | 2012254472 | | 12/2012 |

OTHER PUBLICATIONS

Chinese Office Action mailed Feb. 12, 2015 for Chinese Application No. 201410117483.3, with English machine translation.

* cited by examiner

SPOT WELDING SYSTEM INCLUDING SPOT WELDING GUN

BACKGROUND OF THE INVENTION

1. Field of the Invention

The present invention relates to a spot welding system and, in particular, to a spot welding system including a spot welding gun that welds workpiece to be welded under pressure between a movable electrode tip driven by a servomotor and a stationary electrode tip facing the movable electrode tip.

2. Description of the Related Art

In a spot welding system, an operation of calibrating the relationship between a torque command provided to a servomotor which drives a spot welding gun and welding pressure generated by the torque command at the distal ends of electrode tips is performed. The operation is performed before starting welding. Thereafter, the spot welding gun repeats the operation of welding workpieces to be welded under pressure according to an operation program.

The spot welding gun includes a movable electrode tip and a stationary electrode tip. The movable electrode tip depresses the stationary electrode tip to elastically deform a metal arm to which the stationary electrode tip is attached, thereby generating required welding pressure between the electrode tips. However, repeatedly applying high welding pressure for a long period of time can cause local plastic deformation of the arm or local cracks in the arm because of metal fatigue.

When local plastic deformation or local cracks occurs in the arm of the spot welding gun, the stiffness of the entire arm of the spot welding gun decreases. Accordingly, elastic displacement quantity of the arm of the spot welding gun increases. For this reason, workpiece to be welded can be depressed to degrade the weld quality even when welding pressure is not changed. Furthermore, continuing to use an arm having cracks can cause the arm to further develop cracks and eventually break. Therefore, an operator needs to visually inspect the conditions of the spot welding gun at regular intervals. However, it takes time for the operator to visually check spot welding guns individually and, in addition, it is difficult for an inexperienced operator to detect minute plastic deformation or minute cracks.

Moreover, even when the stiffness of the entire arm of the spot welding gun has not decreased, a mechanical unit of the spot welding gun, for example, ball screws, bearings or the like can become worn or lubricant in a mechanical unit can deteriorate. If this is the case, the frictional resistance of the mechanical unit will change.

For example, as the frictional resistance of a mechanical unit increases, the transmission efficiency of the mechanical unit decreases. Accordingly, even when a torque command that has been calibrated in the past so that desired welding pressure is generated is used, there can be a deviation between actual welding pressure and desired welding pressure.

If that is the case, actual welding pressure generated in accordance with the torque command provided to the servomotor needs to be detected with a pressure sensor and the relationship between the actual welding pressure and the torque command needs to be recalibrated. However, when welding pressure is measured with the pressure sensor, the spot welding system needs to be shut down. Therefore, the calibration operation may not be performed while welding workpieces.

For this reason, actual welding pressure measurement with the pressure sensor after the spot welding system being shut down is likely to be performed at prolonged intervals. Consequently, the spot welding system may be kept in operation without the operator being aware of a deviation in welding pressure, resulting in weld quality degradation. Moreover, since the pressure sensor is relatively expensive, it may be difficult to provide a large number of pressure sensors.

Various methods for solving these problems have been proposed for spot welding guns equipped with a servomotor.

For example, Japanese Laid-open Patent Publication No. 2007-29994 discloses that a regression formula is obtained from the relationship between pressure application time and the position of the distal end of an electrode tip when a number of pressure application operations have been performed beforehand and, when there is a significant departure from the regression formula, the spot welding gun is determined as deteriorated.

In Patent Publication No. 3503359, an elastic displacement quantity of an electrode tip measured by an encoder of a servomotor is multiplied by a predetermined electrode tip support stiffness to obtain the actual welding pressure. Then, a welding pressure coefficient is corrected so that set welding pressure becomes equal to the actual welding pressure.

In Japanese Laid-open Patent Publications No. 2008-296226 and No. 2010-000528, a change in frictional resistance in a mechanical unit of a spot welding gun is detected based on a current flowing through a servomotor in a steady operation state and the change is corrected to correct welding pressure.

However, when a crack occurs in the arm of the spot welding gun in Japanese Laid-open Patent Publication No. 2007-29994, the position of the distal end of electrode tip will change. Accordingly, when determining an abnormality in the spot welding gun based on the relationship between the position of the distal end of the electrode tip and pressure application time, it can be faultily determined that the spot welding gun has not deteriorated even if the gun has actually deteriorated. There is another problem that when a deviation in the position of the distal end of the electrode tip occurs due to wear or deformation of the electrode tip, the accuracy of the diagnosis decreases.

In Patent Publication No. 3503359, the position of the distal end of electrode tip when the electrode tip is abutted is determined by taking advantage of the fact that motor current increases when the electrode tip abuts on another electrode tip. However, to accurately determine the position of the distal end of the electrode tip, the electrode tip needs to be caused to abut on the other electrode tip at low speed. Moreover, welding pressure generated when the electrode tips are brought into contact at low speed differs from the actual welding pressure of the spot welding gun at the time of manufacture. This decreases the accuracy of a detected welding pressure deviation.

Furthermore, the position of the distal end of an electrode tip changes due to wear and deformation of the electro tip during welding operations. Therefore, Patent Publication No. 3503359 has a problem that even though the position of the distal end of the electrode tip in abutment has been measured beforehand, the position of the distal end of the electrode tip may deviate from the measured position.

Variations in welding pressure are also attributed to static friction in a mechanical unit of the spot welding gun. The influence of the static friction may not be known from a current flowing through the servomotor measured in Japanese Laid-open Publications No. 2008-296226 and No.

2010-000528. Therefore, there is a possibility that welding pressure corrected in Japanese Laid-open Patent Publication No. 2008-296226 and No. 2010-000528 do not reflect the influence of the static friction.

The present invention has been made under these circumstances and an object of the present invention is to provide a spot welding system that, when deformation or a crack has occurred in an arm of a spot welding gun or friction in a mechanical unit has changed due to wear in the mechanical unit, enables quick estimation of the occurrence of the abnormality in the spot welding gun.

SUMMARY OF THE INVENTION

To achieve the object stated above, according to a first aspect of the present invention, there is provided a spot welding system including a spot welding gun welding workpieces to be welded under pressure between a movable electrode tip driven by a servomotor and a stationary electrode tip facing the movable electrode tip, the spot welding system including an encoder measuring a rotational position of the servomotor, a welding pressure command value generating unit generating a reference welding pressure command value for the spot welding gun and at least one detective welding pressure command value for applying pressure to the workpieces to be welded between the movable electrode tip and the stationary electrode tip, an elastic displacement quantity deviation calculating unit calculating, as an elastic displacement quantity deviation in the spot welding gun, a rotational position deviation between a rotational position of the servomotor when the servomotor is driven in accordance with the reference welding pressure command value and a rotational position of the servomotor when the servomotor is driven in accordance with the at least one detective welding pressure command value, a storage unit storing the elastic displacement quantity deviation as a reference displacement quantity deviation measured by the elastic displacement quantity deviation calculating unit in a condition where the spot welding gun has been adjusted to be able to properly exert welding pressure, and an estimating unit estimating that there is an abnormality in the spot welding gun when a deviation between an elastic displacement quantity deviation measured by the elastic displacement quantity deviation calculating unit based on the reference welding pressure command value and at least one detective welding pressure command value in a condition where a welding pressure of the spot welding gun needs to be readjusted and the reference displacement quantity deviation stored in the storage unit, is greater than a predetermined value.

According to a second aspect, the spot welding system according to the first aspect further includes a warning unit indicating occurrence of an abnormality in the spot welding gun to the outside when the estimating unit estimates that there is an abnormality in the spot welding gun.

According to a third aspect, the spot welding system according to the first or second aspect further includes a display unit displaying the deviation between the elastic displacement quantity deviation and the reference displacement quantity deviation.

According to a fourth aspect, the spot welding system according to any one of the first to third aspects further includes a storage unit storing the deviation between the elastic displacement quantity deviation and the reference displacement quantity deviation together with a timestamp in chronological order.

According to a fifth aspect, the spot welding system according to the fourth aspect further includes a display unit displaying the deviation between the elastic displacement quantity deviation and the reference displacement quantity deviation together with a timestamp in chronological order.

According to a sixth aspect, the spot welding system according to any one of the first to fifth aspects further includes a welding pressure deviation calculating unit multiplying the deviation between the elastic displacement quantity deviation and the reference displacement quantity deviation by a spring constant of the spot welding gun to obtain a welding pressure deviation.

According to a seventh aspect, the spot welding system according to the sixth aspect further includes a welding pressure correcting unit correcting a torque command value to be provided to the servomotor during a pressure application operation or a rotational position command value to be provided to the servomotor during a pressure application operation based on the welding pressure deviation calculated by the welding pressure calculating unit, when the welding pressure deviation calculated by the welding pressure calculating unit is smaller than a first predetermined deviation value.

According to an eighth aspect, in the spot welding system according to the seventh aspect, when the welding pressure deviation calculated by the welding pressure deviation calculating unit is greater than or equal to the first predetermined deviation value, a correction by the welding pressure deviation correcting unit is not made.

According to a ninth aspect, the spot welding system according to the eighth aspect further includes a warning unit indicating occurrence of an abnormality in the spot welding gun to the outside when the welding pressure deviation calculated by the welding pressure deviation calculating unit is greater than or equal to a second predetermined deviation value.

According to a tenth aspect, the spot welding system according to any one of the sixth to ninth aspects further includes a display unit displaying the welding pressure deviation.

According to an eleventh aspect, the spot welding system according to any one of the sixth to tenth aspects further includes a storage unit storing the welding pressure deviation together with a timestamp in chronological order.

According to a twelfth aspect, the spot welding system according to the eleventh aspect includes a display unit displaying the welding pressure deviation together with a timestamp in chronological order.

These objects, features and advantages of the present invention and other objects, features and advantages will become more apparent from the detailed description of typical embodiments of the present invention illustrated in the accompanying drawings.

DETAILED DESCRIPTION

Embodiments of the present invention will be described below with reference to the accompanying drawings. Throughout the drawings, like reference numerals are given to similar elements. For better understanding, the drawings are not drawn to scale.

Figure 1:
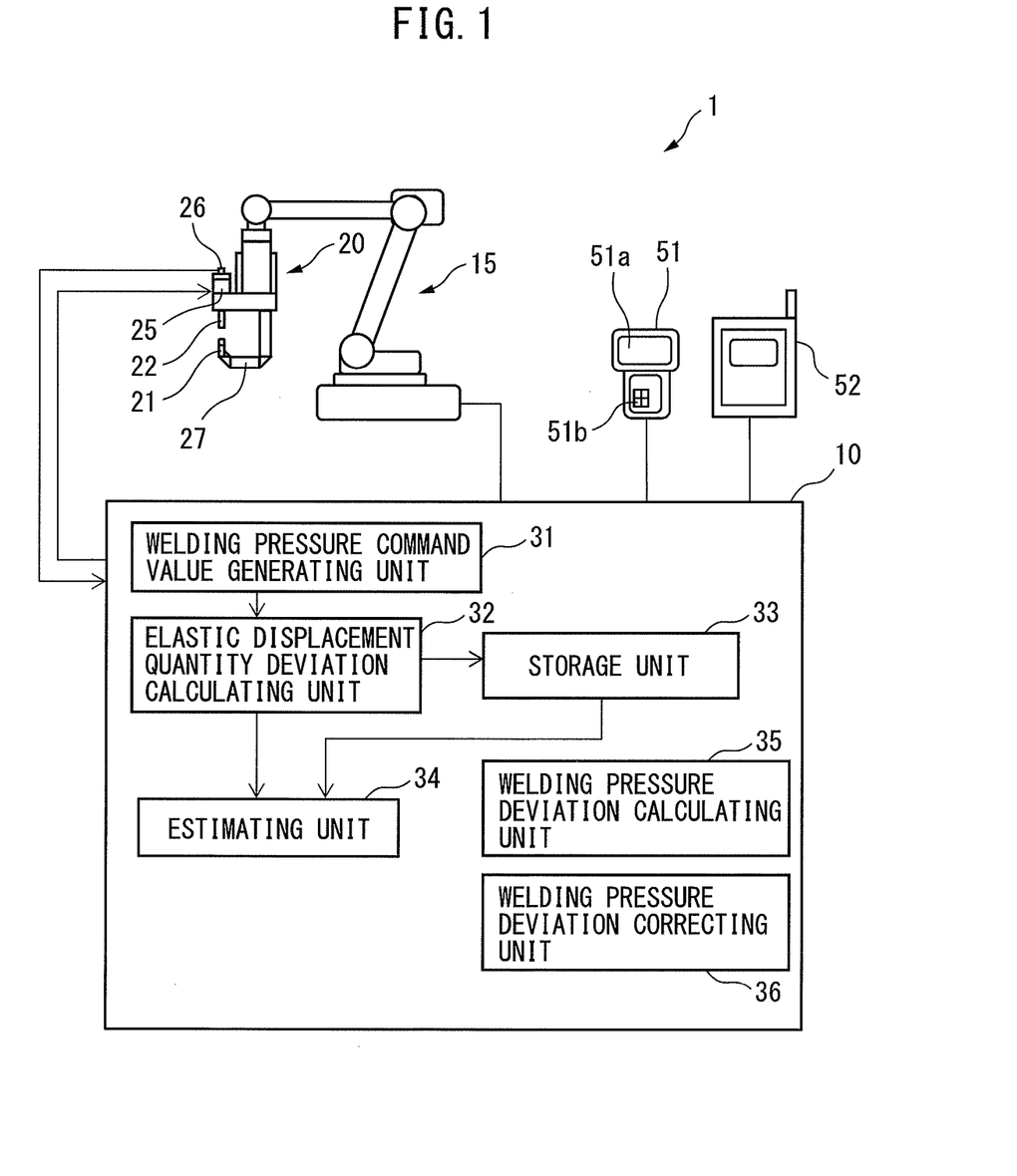
FIG. 1 is a schematic diagram of a spot welding system according to the present invention.

FIG. 1 is a schematic diagram of a spot welding system according to the present invention. The spot welding system 1 mainly includes a multi-joint robot 15, a spot welding gun 20, and a robot controller 10. The multi-joint robot 15 illustrated in FIG. 1 has the spot welding gun 20 at its distal end. The spot welding gun 20 includes a movable electrode tip 22 attached to a gun shaft and a stationary electrode tip 21 facing the movable electrode tip 22.

As can be seen from FIG. 1, the stationary electrode tip 21 is attached to the distal end of a curved metal arm 27 extending from the body of the spot welding gun 20. A servomotor 25 is connected to the movable electrode tip 22. By driving the servomotor 25, the movable electrode tip 22 advances toward the stationary electrode tip 21 along the gun shaft (not depicted) and also retracts from the stationary electrode tip 21.

An encoder 26 is attached to the servomotor 25. The encoder 26 detects the rotational position of the servomotor 25 and provides information indicating the detected position to the robot controller 10. The robot controller 10 controls each servomotor (not depicted) of the multi-joint robot 15. The robot controller 10 also inputs a torque command to the servomotor 25 to control the spot welding gun 20.

By causing the multi-joint robot 15 to operate, the spot welding gun 20 is moved to a desired position. In other words, the multi-joint robot 15 is responsible for positioning the distal end of the stationary electrode tip 21 in a desired position. Then, the spot welding gun 20 moves the movable electrode tip 22 along the gun shaft, sandwiches workpieces to be welded (not depicted) between the stationary electrode tip 21 and the movable electrode tip 22, and applies pressure. By passing a current through the stationary electrode tip 21 and the movable electrode tip 22 in this state, spot welding is performed.

As illustrated in FIG. 1, the robot controller 10 is a digital computer and includes a welding pressure command value generating unit 31 which generates a reference welding pressure command value and at least one detective welding pressure command value for the spot welding gun 20 applying pressure to workpieces to be welded between the stationary electrode tip 21 and the movable electrode tip 22.

The robot controller 10 further includes an elastic displacement quantity deviation calculating unit 32 which calculates, as an elastic displacement quantity deviation of the spot welding gun 20, a rotational position deviation between the rotational position of the servomotor 25 when the servomotor 25 is driven based on a reference welding pressure command value and the rotational position of the servomotor 25 when the servomotor 25 is driven based on at least one detective welding pressure command value.

The robot controller 10 also includes a storage unit 33 storing, as a reference displacement quantity deviation, an elastic displacement quantity deviation measured by the elastic displacement quantity deviation calculating unit 32 when the spot welding gun 20 has been adjusted to be able to properly exert welding pressure. The storage unit 33 also stores various programs and data.

The robot controller 10 further includes an estimating unit 34 which estimates that there is an abnormality in the spot welding gun 20 when the deviation between an elastic displacement quantity deviation measured by the elastic displacement quantity deviation calculating unit 32 based on the reference welding pressure command value and at least one detective welding pressure command value in a condition where a welding pressure of the spot welding gun 20 needs to be readjusted and the reference displacement quantity deviation stored in the storage unit 33 is greater than a predetermined value.

The robot controller 10 further includes a welding pressure deviation calculating unit 35 which multiplies the deviation between the elastic displacement quantity deviation and the reference displacement quantity deviation by a spring constant of the spot welding gun 20 to obtain a welding pressure deviation. The robot controller 10 further includes a welding pressure deviation correcting unit 36 which corrects a torque command value to be provided to the servomotor 25 in a pressure application operation or a rotational position command value to be provided to the servomotor 25 in a pressure application operation based on a welding pressure deviation calculated by the welding pressure deviation calculating unit 35.

In addition, a console 51 is connected to the robot controller 10. Various items of information from the robot controller 10 are displayed on a display unit 51*a* of the console 51, so that an operator can view the items of information. The operator can perform various operations and settings of the robot controller 10 through an input unit 51*b* (a keyboard) of the console 51.

A peripheral device 52 connected to the robot controller 10 is configured to communicate with the robot controller 10 to perform predetermined specialized processes, for example, a stop process. For example, when the peripheral device 52 is a line control panel, the peripheral device 52 manages a plurality of robot controllers.

Figure 2:
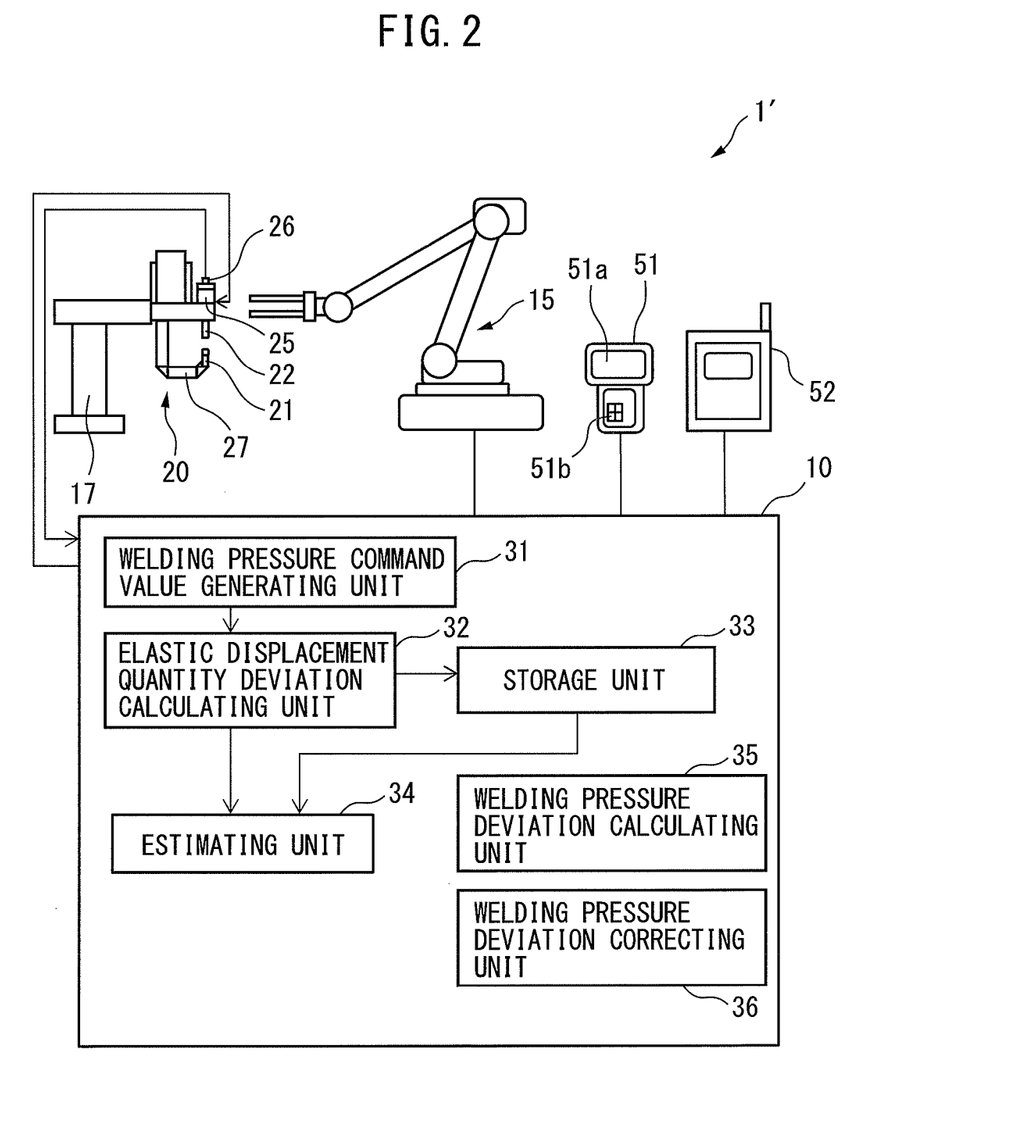
FIG. 2 is a schematic diagram of another spot welding system.

FIG. 2 is a schematic diagram of another spot welding system. In the spot welding system 1' illustrated in FIG. 2, a spot welding gun 20 is fixed on a fixing base 17. A hand piece 16 is provided at a distal end of an arm of a multi-joint robot 15.

The multi-joint robot 15 holds workpieces to be welded (not depicted) with the hand piece 16 and positions the workpieces to be welded between a stationary electrode tip 21 and a movable electrode tip 22. Then, the spot welding gun 20 moves the movable electrode tip 22 along a gun shaft, sandwiches the workpieces to be welded between the stationary electrode tip 21 and the movable electrode tip 22, and applies pressure. Spot welding is performed by passing a current through the stationary electrode tip 21 and the movable electrode tip 22 in this state. The robot controller 10 illustrated in FIG. 2 is similar to that described above and therefore, repeated description of the robot controller 10 will be omitted. While the spot welding system 1 illustrated in FIG. 1 will be described below, the spot welding system 1' illustrated in FIG. 2 is generally similar to the spot welding system 1.

Figure 3:
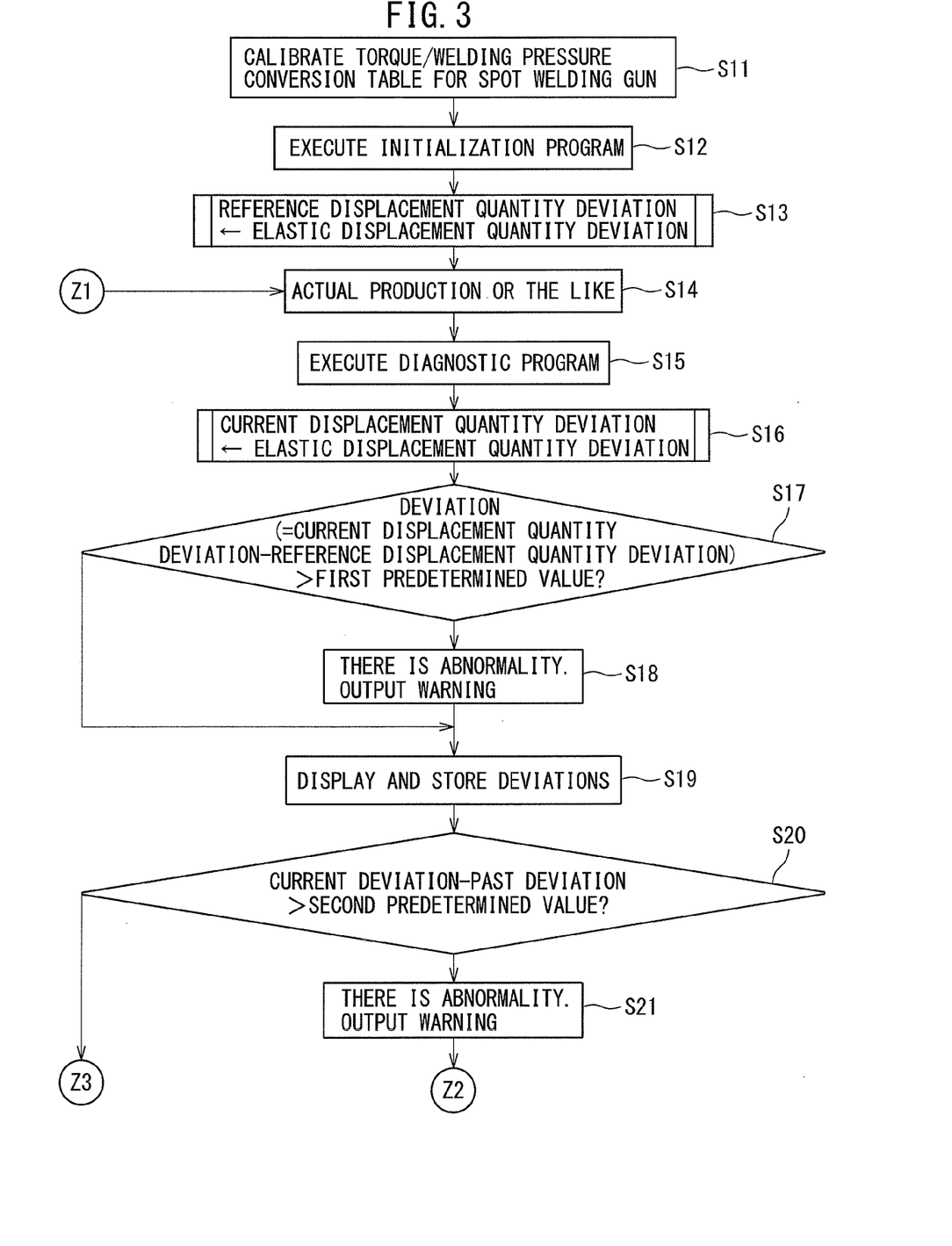
FIG. 3 is a flowchart illustrating an operation of a spot welding system according to the present invention.

FIG. 3 is a flowchart illustrating an operation of the spot welding system according to the present invention. At step S11 of FIG. 3, a torque/welding pressure conversion table for the spot welding gun 20 is created.

Specifically, a pressure application operation is performed between the stationary electrode tip 21 and the movable electrode tip 22 in accordance with each of a plurality of torque commands T1, T2, .... Then, actual pressure in each pressure application operation is measured with a pressure sensor (not depicted). Based on the results of the measurements, a torque/welding pressure conversion table indicating the relationship between torque and welding pressure is created. Note that when a torque/welding pressure conversion table has been created beforehand, step S11 may be omitted.

Figure 4:
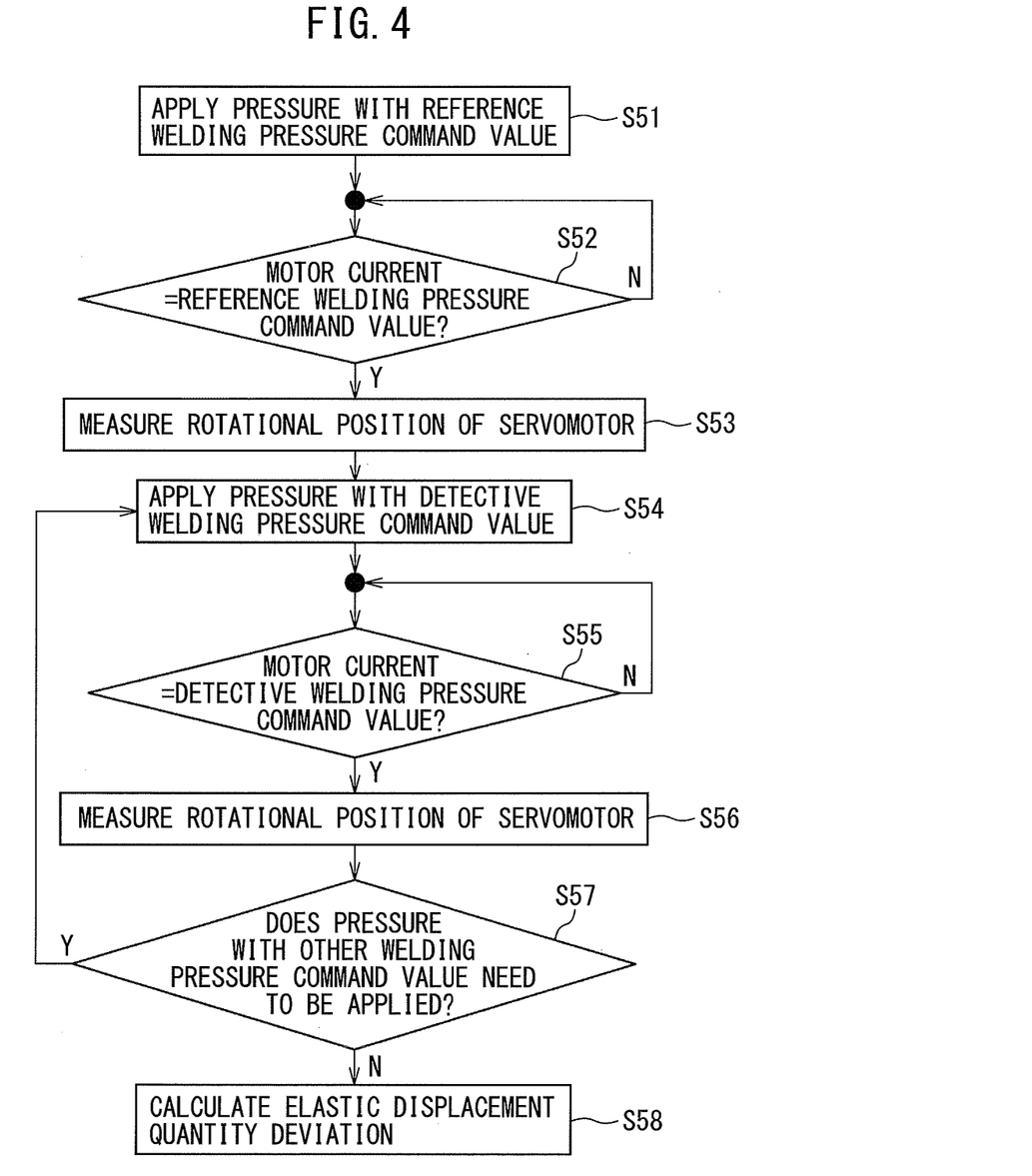
FIG. 4 is a flowchart for obtaining an elastic displacement quantity deviation.

Then, at step S12, an initialization program is executed. The initialization program is executed when the spot welding gun 20 has been adjusted to be able to properly exert its welding power. Thereafter, at step S13, the elastic displacement quantity deviation calculating unit 32 measures an elastic displacement quantity deviation. FIG. 4 is a flowchart for obtaining the elastic displacement quantity deviation. A method for calculating the elastic displacement quantity deviation will be described below with reference to FIG. 4.

First, the pressure command value generating unit 31 generates a reference welding pressure command value f0 and at least one detective welding pressure command values f1, f2, f3. While the command values are in the relationship f0<f1<f2<f3 in the embodiment descried with reference to the figure, the welding pressure command values f0, f1, f2, f3 may be in other relationship.

At step S51 of FIG. 4, pressure is applied to workpieces to be welded (not depicted) between the movable electrode tip 22 and the stationary electrode tip 21 based on the reference welding pressure command value f0 generated by the welding pressure command value generating unit 31. Then, determination is made at step S52 as to whether a motor current flowing through the servomotor 25 has reached the reference welding pressure command value f0.

When the motor current has reached the reference welding pressure command value f0, the rotational position x0 of the servomotor 25 is measured by the encoder 26 (step S53). The rotational position x0 is stored in the storage unit 33 as an elastic displacement quantity. Note that when it is determined at step S52 that the motor current has not reached the reference welding pressure command value f0, the determination operation at step S52 is repeated until the motor current reaches the reference welding pressure command value f0.

Then at step S54, pressure is applied to the workpieces to be welded (not depicted) between the movable electrode tip 22 and the stationary electrode tip 21 based on a detective welding pressure command value, for example the detective welding pressure command value f1. Then, at step S55, determination is made as to whether the motor current flowing through the servomotor 25 has reached the detective welding pressure command value f1.

When the motor current has reached the detective welding pressure command value f1, the rotational position x1 of the servomotor 25 is measured by the encoder 26 (step S56). The rotational position x1 is stored in the storage unit 33 as an elastic displacement quantity. Note that when it is determined at step S55 that the motor current has not reached the detective welding pressure command value f1, the determination operation at step S55 is repeated until the motor current reaches the detective welding pressure command value f1.

Then, at step S57, determination is made as to whether the same operation needs to be performed based on other detective welding pressure command values f2, f3. When rotational positions x2, x3 of the servomotor 25 have been measured respectively for other detective welding pressure command values f2, f3, the process proceeds to the step S58. At step S58, the elastic displacement quantity deviation calculating unit 32 calculates an elastic displacement quantity deviation.

Figure 5:
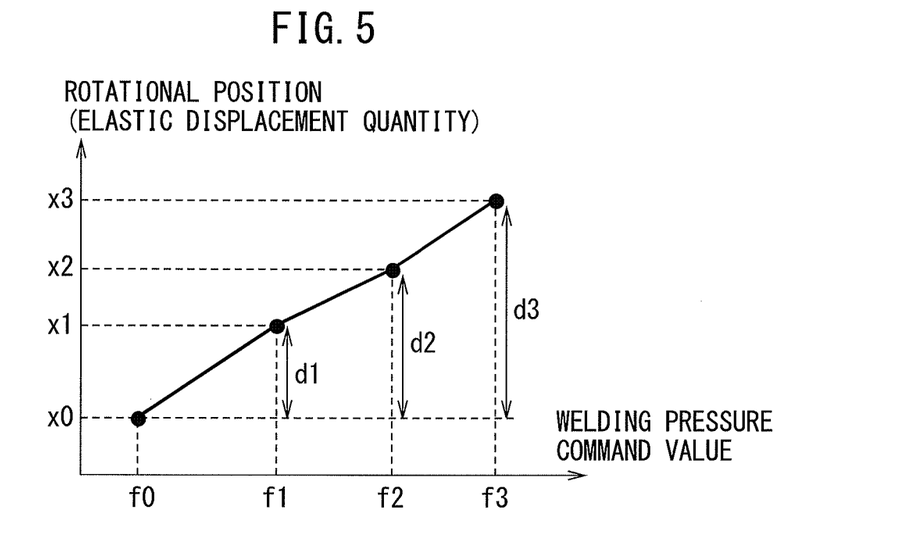
FIG. 5 is a diagram illustrating the relationship between welding pressure command values and rotational positions.

FIG. 5 is a diagram illustrating the relationship between welding pressure command values and rotational positions. The horizontal axis of FIG. 5 represents welding pressure command values and the vertical axis represents rotational positions. As can be seen from FIG. 5, the rotational position increases with increasing welding pressure command value.

The elastic displacement quantity deviation calculating unit 32 calculates a deviation between the rotational position x0 corresponding to the reference welding pressure command value f0 and each of the rotational positions x1, x2, x3 corresponding to the welding pressure command values f1, f2, f3. In other words, as can be seen from FIG. 5, the elastic displacement quantity deviation calculating unit 32 calculates elastic displacement quantity deviations d1 (=x1−x0), d2 (=x2−x0), d3 (=x3−x0).

Note that the pressure application operation may be performed multiple times for one welding pressure command value, for example, the reference welding pressure command value f0, and the average of multiple rotational positions x0 may be used as the ultimate rotational position x0. This can reduce the distribution of elastic displacement quantities.

While the rotational position of the servomotor 25 is measured when the motor current has reached a welding pressure command value at steps S52 and S55, the rotational position of the servomotor 25 may be measured sequentially at predetermined time intervals and, when the rotational position no longer changes, it may be determined that welding pressure corresponding to a welding pressure command value has been obtained and the rotational position at that time point may be used.

Referring back to FIG. 3, the elastic displacement quantity deviations d1, d2, d3 are stored in the storage unit 33 as reference displacement quantity deviations b1, b2, b3, respectively, at step S13 of FIG. 3. At step S14, the spot welding system 1 is caused to operate in accordance with a normal operation program to weld workpieces to be welded (not depicted).

When readjustment of the welding pressure of the spot welding gun 20 becomes necessary, the process proceeds to step S15. At step S15, a diagnostic program is executed. The diagnostic program may be practically the same as the initialization program. The program causes the elastic displacement quantity deviation calculating unit 32 to calculate elastic displacement quantity deviations again as described above. Then, at step S16, the elastic displacement quantity deviations d1', d2', d3' calculated at step S15 are stored in the storage unit 33 as current displacement quantity deviations n1, n2, n3.

Then at step S17, the estimating unit 34 subtracts the reference displacement quantity deviations b1, b2, b3 from the current displacement quantity deviations n1, n2, n3, respectively, to obtain new deviations v1(=n1−b1), v2 (=n2−b2), v3 (=n3−b3). The estimating unit 34 then determines whether or not the deviations v1, . . . are greater than a first predetermined value. The first predetermined value is a value experimentally or otherwise obtained beforehand and is stored in the storage unit 33. Note that the same applies to the other predetermined values.

Figure 6:
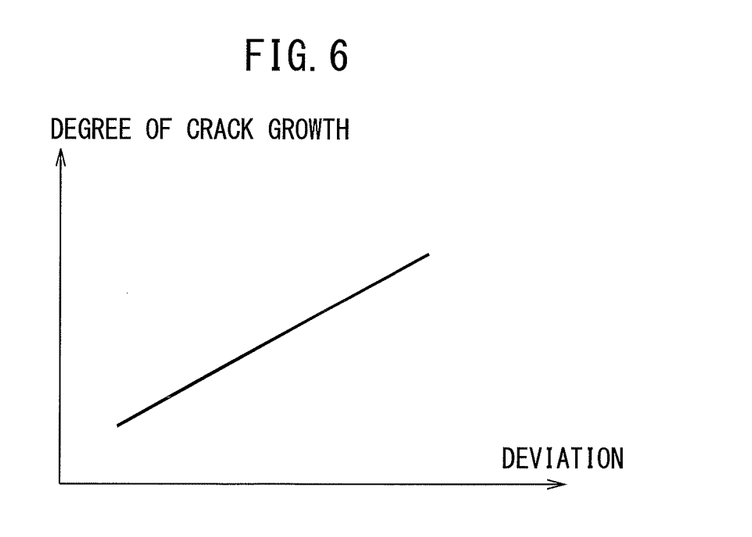
FIG. 6 is a diagram illustrating the relationship between deviation and the degree of crack growth.

FIG. 6 is a diagram illustrating the relationship between deviation v and the degree of growth of a crack in the arm 27. The horizontal axis in FIG. 6 represents deviation v1, . . . and the vertical axis represents the degree of growth of a crack developed in the arm 27. As illustrated in FIG. 6, a crack in the arm 27 grows with increasing deviation v.

Therefore, when deviations v1, . . . are greater than the first predetermined value at step S17 of FIG. 3, it is determined at step S18 that there is an abnormality in the spot welding gun 20. In other words, it is determined at step S18 that a crack or a plastic deformation has occurred in the arm 27 of the spot welding gun 20. Note that it may be determined that there is an abnormality in the spot welding gun 20 when at least one of deviations v1, v2, v3 is greater than the first predetermined value or when all of deviations v1, v2, v3 are greater than the first predetermined value.

When it is determined at step S18 that there is an abnormality, preferably a warning is issued to the operator through the display unit 51a of the console 51. If that is the case, the operator stops the spot welding system 1 and takes an action such as replacing a part of the spot welding gun 20, for example, the arm 27. Alternatively, the operator may use the peripheral device 52 to stop the spot welding system 1. In this way, a poor weld can be prevented from occurring.

Then the process proceeds to step S19, where the deviations v1, v2, v3 are stored in the storage unit 33 together with timestamps. At step S19, the operator displays the stored deviations v1, . . . and past deviations v1', . . . on the console 51 one after another or at once. When it is likely that the difference between the deviations v1, . . . and the past deviations v1', . . . will exceed a second predetermined value before long, which will be described later, the operator replaces a part of the spot welding gun 20, for example the arm 27 ahead of time. This can prevent degradation of the weld quality in the spot welding system 1 and can also avoid an unexpected sudden shutdown of the spot welding system 1.

At step S20, the deviations v1, v2, v3 are compared with the past deviations v1', v2', v3' stored in the storage unit 33. When the differences between the deviations v1, v2, v3 and the past deviations v1', v2', v3' is greater than the second predetermined value, it is determined that there is an abnormality and the operator can be alerted (step S21).

Figure 7:
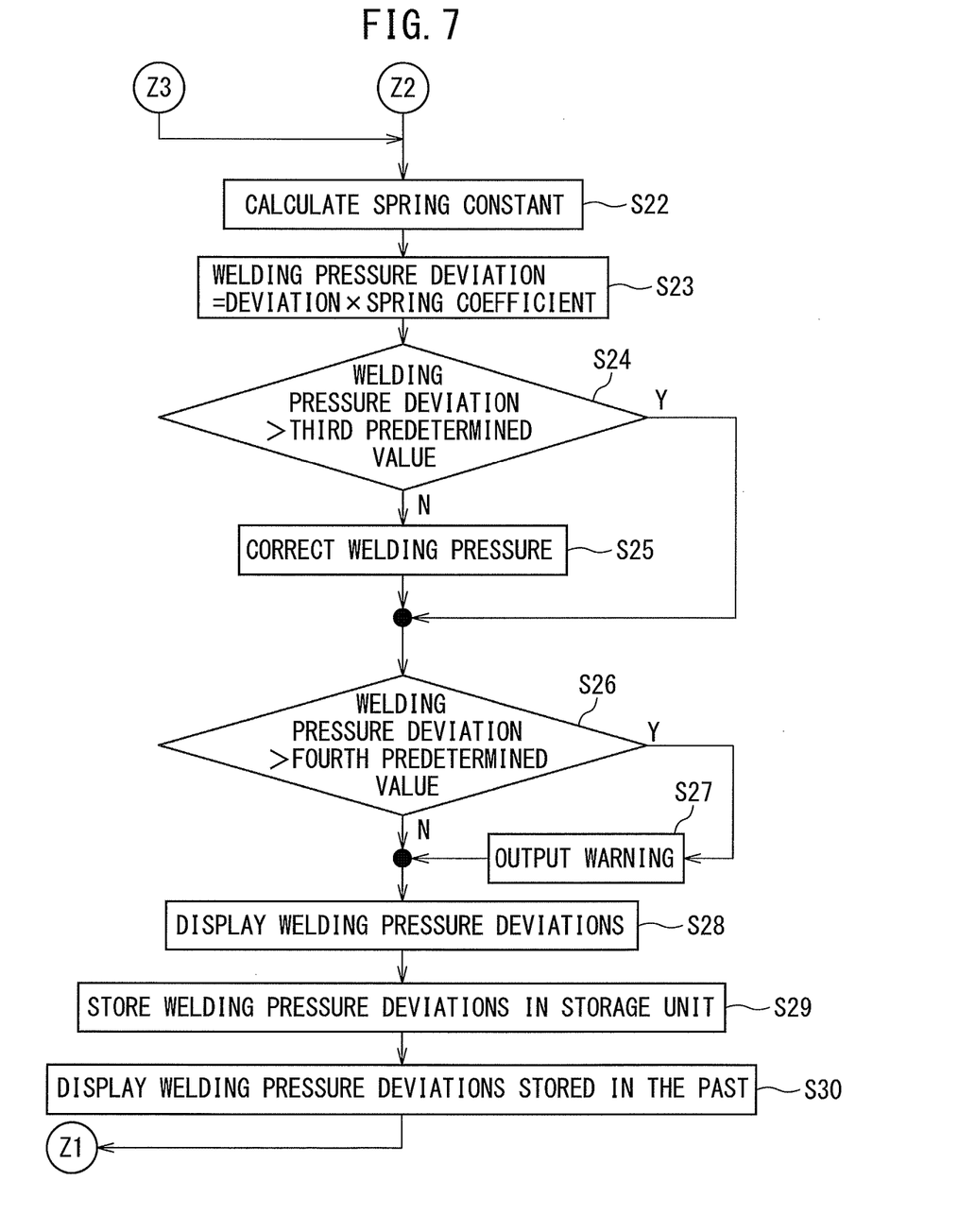
FIG. 7 is a flowchart illustrating an additional operation of the spot welding system according to the present invention.

FIG. 7 is a flowchart illustrating an additional operation of the spot welding system according to the present invention. The additional operation illustrated in FIG. 7 may be performed immediately after the process of the flowchart in FIG. 3.

At step S22 of FIG. 7, the spring constant of the spot welding gun 20 is calculated. The spring constant can be obtained using a well-known method from the relationship between a plurality of welding pressure command values used for calculating the reference displacement quantity deviations and a plurality of rotational positions. In other words, the spring constant is equivalent to the gradient of a straight line illustrated in FIG. 5.

Then, at step S23, the welding pressure deviation calculating unit 35 multiplies each of the deviations v1, v2, v3 obtained at step S17 by the spring constant K obtained at step S22 to calculate welding pressure deviations A1 (=K×v1), A2 (=K×v2), A3 (=K×v3). According to the present invention, when friction has changed due to wear in a mechanical unit, the welding pressure calculating unit 35 automatically calculates with a high degree of accuracy, a welding pressure deviation that occurs with the change of the friction.

When the welding pressure deviation calculating unit 35 is used, the operation of measuring welding pressure with a pressure sensor can be omitted and therefore, the number of operations required for readjusting welding pressure can be reduced. Furthermore, since the rotational position of the servomotor 25 of the spot welding gun 20 during application of pressure is measured with the encoder 26 to detect a welding pressure deviation in the present invention, equipment for measuring welding pressure, for example, a pressure sensor, does not need to be added and accordingly, increase of equipment cost can be avoided.

Figure 8:
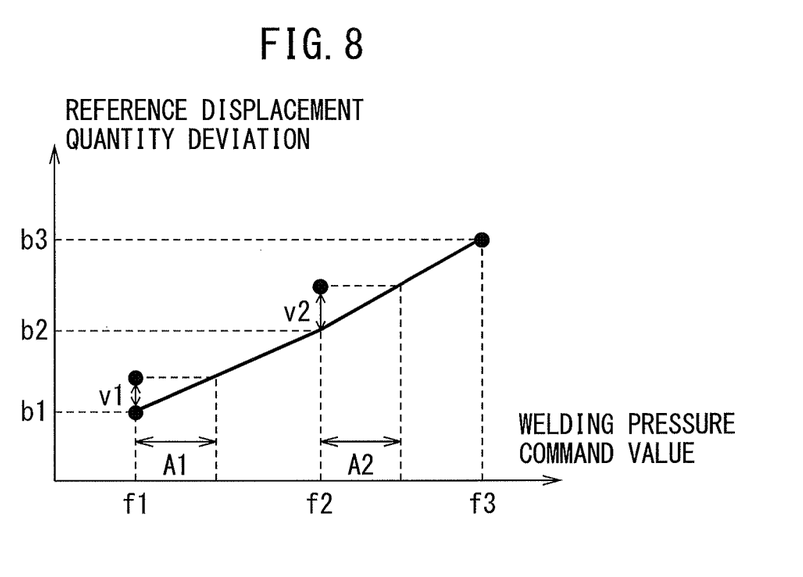
FIG. 8 is a diagram illustrating the relationship between welding pressure commands and rotational positions.

FIG. 8 is a diagram illustrating the relationship between welding pressure command values and rotational positions. The horizontal axis in FIG. 8 represents welding pressure command values and the vertical axis represents reference displacement quantity deviations. FIG. 8 also illustrates deviations v1, v2 described previously. As can be seen from FIG. 8, welding pressure deviations A1, A2 corresponding to the deviations v1, v2 may be obtained using linear interpolation. The same applies to welding pressure A3, not depicted in FIG. 8. In this case, the welding pressure deviations A1, . . . can be calculated without calculating the spring constant K.

Referring back to FIG. 7, determination is made at step S24 as to whether each of the welding pressure deviations A1, . . . is greater than a third predetermined value. When each of the welding pressure deviations A1, . . . is not greater than the third predetermined value, the process proceeds to step S25, where the welding pressure is corrected. In other words, at step 25, the torque command value to be provided to the servomotor 25 is corrected or the rotational position command value for the servomotor 25 is corrected, so that the welding pressure deviation A1, . . . becomes zero. As a result, a desired welding pressure can be achieved to improve the weld quality.

Note that when each of the welding pressure deviations A1, . . . is greater than the third predetermined value, the process proceeds to step S26 without correcting the welding pressure. In that case, since welding pressure correction is not performed, a poor weld, which would otherwise occur due to an abnormal correction, can be prevented.

At step S26, the welding pressure deviations A1, . . . are compared with a fourth predetermined value. The fourth predetermined value is greater than the third predetermined value. When the welding pressure deviation A1 is greater than the fourth predetermined value, a warning is issued to the operator through the display unit 51a of the console 51 (step S27). Alternatively, the spot welding system 1 may be shut down through the peripheral device 52.

On the contrary, when the welding pressure deviation A1 is not greater than the fourth predetermined value, the process proceeds to step S28 without outputting a warning. In other words, in the present invention welding pressure is not corrected and a warning is not output only when the welding pressure deviations A1, . . . are between the third and fourth predetermined values.

Then, at step S28, the welding pressure deviations A1, . . . are displayed on the display unit 51a of the console 51. This allows the operator to check the welding pressure deviation values on the display unit 51a of the console 51. When a welding pressure deviation is large, the operator can shut down the spot welding system 1 and make a readjustment of the welding pressure.

Thereafter, at step S29, the welding pressure deviations A1, . . . are stored in the storage unit 33 in chronological order. A plurality of welding pressure deviations stored in the past are displayed together on the display unit 51a of the console 51 (step S30). This, for example allows the operator to know that the welding pressure is rapidly changing. Furthermore, when the amount of change in welding pressure deviation is greater than a predetermined value, a warning may be output on the display unit 51a of the console 51. When a welding pressure deviation is likely to exceed the fourth predetermined value before long, the operator may readjust the welding pressure ahead of time. This can proactively prevent degradation of the weld quality.

Note that the diagnostic program may be executed during a period in which the robot returns to the original position after the end of a welding operation. Crack diagnosis and welding pressure deviation diagnosis on the spot welding gun 20 can be performed without increasing the production time.

According to the present invention, whether or not there is an abnormality in the spot welding gun 20 is estimated based only on the rotational position of the servomotor 25. Accordingly, when an excessive deformation of the arm 27 of the spot welding gun 20 has occurred or when friction in the mechanical unit of the spot welding gun 20 has changed, it can be readily estimated that there is an abnormality in the spot welding gun 20. Furthermore, according to the present invention, false detection of a crack in the arm 27 is unlikely as compared with conventional techniques which require pressure application time.

Furthermore, since deviations v1, . . . can be displayed on the display unit 51a of the console 51, the operator can know the degree of deformation and crack growth in the arm 27. In addition, since welding pressure deviations can also be displayed on the display unit 51a of the console 51, the operator can find a change in friction in the mechanical unit.

Moreover, according to the present invention, determination as to whether there is an abnormality is made based on a deviation between an elastic displacement quantity deviation and a reference displacement quantity deviation. Therefore, even when the position of the distal end of the electrode tip has changed due to wear or deformation, an abnormality in the spot welding gun 20 can be determined with a high degree of accuracy.

Furthermore, the present invention eliminates the need for the operator to perform visual inspection of the conditions of the spot welding gun 20 at regular intervals and enables detection of a minute abnormality that may not be detected by visual inspection. Moreover, since only the rotational position of the servomotor 25 of the spot welding gun 20 during application of pressure needs to be measured through the encoder 26, no additional equipment for measurement is required and therefore, increase of equipment cost can be avoided.

ADVANTAGEOUS EFFECTS OF THE INVENTION

According to the first aspect, determination is made as to whether or not there is an abnormality in the spot welding gun only on the basis of the rotational position of the servomotor. Accordingly, when an excessive deformation or crack has occurred in the arm of the spot welding gun and when friction in the mechanical unit of the spot welding gun has changed, it can be readily estimated that there is an abnormality in the spot welding gun. Moreover, the need for the operator to visually inspect the conditions of the spot welding gun at regular intervals can be eliminated and a minute abnormality that may not be detected by visual inspection can be detected. In addition, since only the rotational position of the servomotor of the spot welding gun during application of pressure needs to be measured through the encoder, no additional equipment for measurement is required and therefore increase of equipment cost can be avoided.

According to the second and ninth aspects, since a warning indicating an abnormality in the spot welding gun to the outside is output, the operator who noticed the warning can stop the welding operation to prevent poor weld from occurring.

According to the third to fifth aspects and the tenth to twelfth aspects, the operator can know the current degree of growth of a crack in the arm of the spot welding gun, a welding pressure deviation, and the tendencies of change in the degree of crack growth and deviations with time.

According to the sixth aspect, when friction in the mechanical unit has changed due to wear in the mechanical unit, a welding pressure deviation associated with the change can be automatically detected with a high degree of accuracy. The operation of measuring welding pressure with a pressure sensor can be omitted and therefore, the number of operations required for readjusting welding pressure can be reduced. Furthermore, since the rotational position of the servomotor of the spot welding gun during application of pressure is measured through the encoder to detect a welding pressure deviation, no additional equipment for welding pressure measurement is required and therefore, increase of equipment cost can be avoided.

According to the seventh aspect, since a torque command value to be provided to the servomotor or a rotational position command for the servomotor is corrected based on a detected welding pressure deviation, desired welding pressure can be achieved to improve the weld quality.

According to the eighth aspect, since correction of a welding pressure deviation is not performed, a poor weld which would otherwise occur due to an abnormal correction can be prevented.

While the present invention has been described with typical embodiments, those skilled in the art will understand that the modification described above and various other modifications, omissions, and additions can be made without departing from the scope of the present invention.

What is claimed is:

1. A spot welding system comprising:
   a robot including:
      a spot welding gun,
      a movable electrode tip driven by a servomotor,
      a stationary electrode tip facing the movable electrode tip,
      an encoder measuring a rotational position of the servomotor, and
   wherein the spot welding system is configured to weld workpieces under pressure between the movable electrode tip and the stationary electrode tip; and
   a robot controller including:
      a welding pressure command value generating unit generating a reference welding pressure command value for the spot welding gun and at least one detective welding pressure command value for applying pressure to the workpieces to be welded between the movable electrode tip and the stationary electrode tip;
      an elastic displacement quantity deviation calculating unit calculating:
         a first elastic displacement quantity deviation in the spot welding gun based on an actual rotational position deviation between a rotational position of the servomotor when the servomotor is driven in accordance with the reference welding pressure command value and an actual rotational position of the servomotor when the servomotor is driven in accordance with the at least one detective welding pressure command value, and a second elastic displacement quantity deviation in the spot welding gun based on another actual rotational position deviation between another rotational position of the servomotor when the servomotor is driven in accordance with the reference welding pressure command value and another actual rotational position of the servomotor when the servomotor is driven in accordance with the at least one other detective welding pressure command value;

a storage unit storing the first elastic displacement quantity deviation as a reference displacement quantity deviation determined by the elastic displacement quantity deviation calculating unit in a condition where the spot welding gun has been adjusted to be able to properly exert welding pressure; and an estimating unit estimating that there is an abnormality in the spot welding gun when a computed deviation between the first elastic displacement quantity deviation and the second elastic displacement quantity deviation, is greater than a predetermined value.

2. The spot welding system according to claim 1, further comprising a warning unit indicating occurrence of an abnormality in the spot welding gun to the outside when the estimating unit estimates that there is an abnormality in the spot welding gun.

3. The spot welding system according to claim 1, further comprising a display unit displaying the deviation between the elastic displacement quantity deviation and the reference displacement quantity deviation.

4. The spot welding system according to claim 1, further comprising a storage unit storing the deviation between the elastic displacement quantity deviation and the reference displacement quantity deviation together with a timestamp in chronological order.

5. The spot welding system according to claim 1, further comprising a welding pressure deviation calculating unit multiplying the deviation between the elastic displacement quantity deviation and the reference displacement quantity deviation by a spring constant of the spot welding gun to obtain a welding pressure deviation.

6. The spot welding system according to claim 4, further comprising a display unit displaying the deviation between the elastic displacement quantity deviation and the reference displacement quantity deviation together with a timestamp in chronological order.

7. The spot welding system according to claim 5, further comprising a welding pressure correcting unit correcting a torque command value to be provided to the servomotor during a pressure application operation or a rotational position command value to be provided to the servomotor during a pressure application operation based on the welding pressure deviation calculated by the welding pressure calculating unit, when the welding pressure deviation calculated by the welding pressure calculating unit is smaller than a first predetermined deviation value.

8. The spot welding system according to claim 7, wherein when the welding pressure deviation calculated by the welding pressure deviation calculating unit is greater than or equal to the first predetermined deviation value, a correction by the welding pressure deviation correcting unit is not made.

9. The spot welding system according to claim 8, further comprising a warning unit indicating occurrence of an abnormality in the spot welding gun to the outside when the welding pressure deviation calculated by the welding pressure deviation calculating unit is greater than or equal to a second predetermined deviation value.

10. The spot welding system according to claim 5, further comprising a display unit displaying the welding pressure deviation.

11. The spot welding system according to claim 5, further comprising a storage unit storing the welding pressure deviation together with a timestamp in chronological order.

12. The spot welding system according to claim 11, comprising a display unit displaying the welding pressure deviation together with a timestamp in chronological order.

* * * * *